(12) United States Patent
Hvass et al.

(10) Patent No.: US 8,838,273 B2
(45) Date of Patent: Sep. 16, 2014

(54) SYSTEM FOR AUTONOMOUSLY DISPENSING MEDIA ON LARGE SCALE SURFACES

(75) Inventors: Paul Hvass, San Antonio, TX (US); Paul Thomas Evans, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 1119 days.

(21) Appl. No.: 12/332,096

(22) Filed: Dec. 10, 2008

(65) Prior Publication Data
US 2010/0143089 A1   Jun. 10, 2010

(51) Int. Cl.
| | |
|---|---|
| *B25J 5/00* | (2006.01) |
| *B05B 13/04* | (2006.01) |
| *G05D 1/02* | (2006.01) |
| *B05B 13/00* | (2006.01) |

(52) U.S. Cl.
CPC .......... *G05D 1/0272* (2013.01); *B05B 13/0431* (2013.01); *B25J 5/00* (2013.01); *G05D 1/028* (2013.01); *G05D 1/027* (2013.01); *G05D 1/024* (2013.01); *B05B 13/005* (2013.01); *Y10S 901/01* (2013.01); *Y10S 901/02* (2013.01); *Y10S 901/09* (2013.01); *Y10S 901/30* (2013.01); *Y10S 901/43* (2013.01)
USPC ............. 700/253; 700/56; 700/245; 700/250; 901/1; 901/2; 901/9; 901/30; 901/43

(58) Field of Classification Search
CPC .... B05B 13/005; B05B 13/0431; B05B 3/00; B05B 3/18; G01B 11/002; G01B 11/005; B25J 5/00; B25J 5/007
USPC ............. 700/56–66, 184, 186–193, 245, 250, 700/253, 254; 901/1, 2, 9, 14, 30, 41, 43; 318/568.11, 568.12, 568.16, 568.21
See application file for complete search history.

(56) References Cited

U.S. PATENT DOCUMENTS

| | | | |
|---|---|---|---|
| 5,121,329 A | 6/1992 | Crump | |
| 5,666,202 A | 9/1997 | Kyrazis | |
| 5,974,348 A | 10/1999 | Rocks | |
| 6,124,858 A | 9/2000 | Ge | |
| 6,321,137 B1 | 11/2001 | De Smet | |
| 6,519,860 B1 * | 2/2003 | Bieg et al. | 33/503 |
| 6,677,941 B2 | 1/2004 | Lin | |
| 6,873,880 B2 | 3/2005 | Hooke | |
| 6,898,484 B2 | 5/2005 | Lemelson | |
| 6,980,881 B2 | 12/2005 | Greenwood | |
| 7,061,628 B2 | 6/2006 | Franke | |
| 7,233,837 B2 | 6/2007 | Swain | |
| 7,259,535 B1 | 8/2007 | Pastusak | |
| 2005/0196543 A1 * | 9/2005 | Morton | 427/421.1 |
| 2008/0125909 A1 * | 5/2008 | Eickmeyer et al. | 700/250 |
| 2009/0088897 A1 * | 4/2009 | Zhao et al. | 700/250 |

OTHER PUBLICATIONS

Metris, "Company Profile," available at http://www.metris.com/company/company₁₃ profile/; retrieved on Dec. 16, 2008.

(Continued)

*Primary Examiner* — Khoi Tran
*Assistant Examiner* — Spencer Patton
(74) *Attorney, Agent, or Firm* — Grossman, Tucker et al

(57) ABSTRACT

The present disclosure relates to a system, method and article which may be configured to autonomously dispense a medium onto a relatively large surface relatively accurately.

17 Claims, 7 Drawing Sheets

(56) References Cited

OTHER PUBLICATIONS

Metris, "Basics of iGPS," available at http://www.metris.com/large_volume_tracking_positioning/basics_of_igps/; retrieved on Dec. 16, 2008.
Metris, "iGPS vs. Laser Tracker," available at http://www.metris.com/products/igps/igps_vs_tracker/; retrieved on Dec. 16, 2008.
Metris, "iGPS—Large scale metrology," available at http://www.metris.com/large_volume_tracking_positioning/igps/; retrieved on Dec. 16, 2008.
Robotics Research Group, "Condition Based Maintenance," available at http://www.robotics.utexas.edu/rrg/research/conditionb/, retrieved on Dec. 16, 2008.
Metris, "Introduction to Large Scale Portable Metrololgy," brochure, undated.
Metris, "Laser Radar MV224/260," brochure, undated.
Robotics Research Group, "Indoor GPS Metrology System and Modular Robot Metrology"; available at http://www.robotics.utexas.edu/rrg/research/metrology/, retrieved on Jul. 10, 2008.
Kang, et al, Proceedings of ASME IMECE'04: International Mechanical Engineering Congress and RD&D Expo, Nov. 13-19, 2004, Anaheim, CA. Indoor GPS Metrology System With 3D Probe for Precision Applications (8 pgs).
Kang, et al, Kinematic Model and Metrology System for Modular Robot Calibration; this work sponsored by the National Science Foundation and the US Dept. of Energy (6 pgs).

* cited by examiner

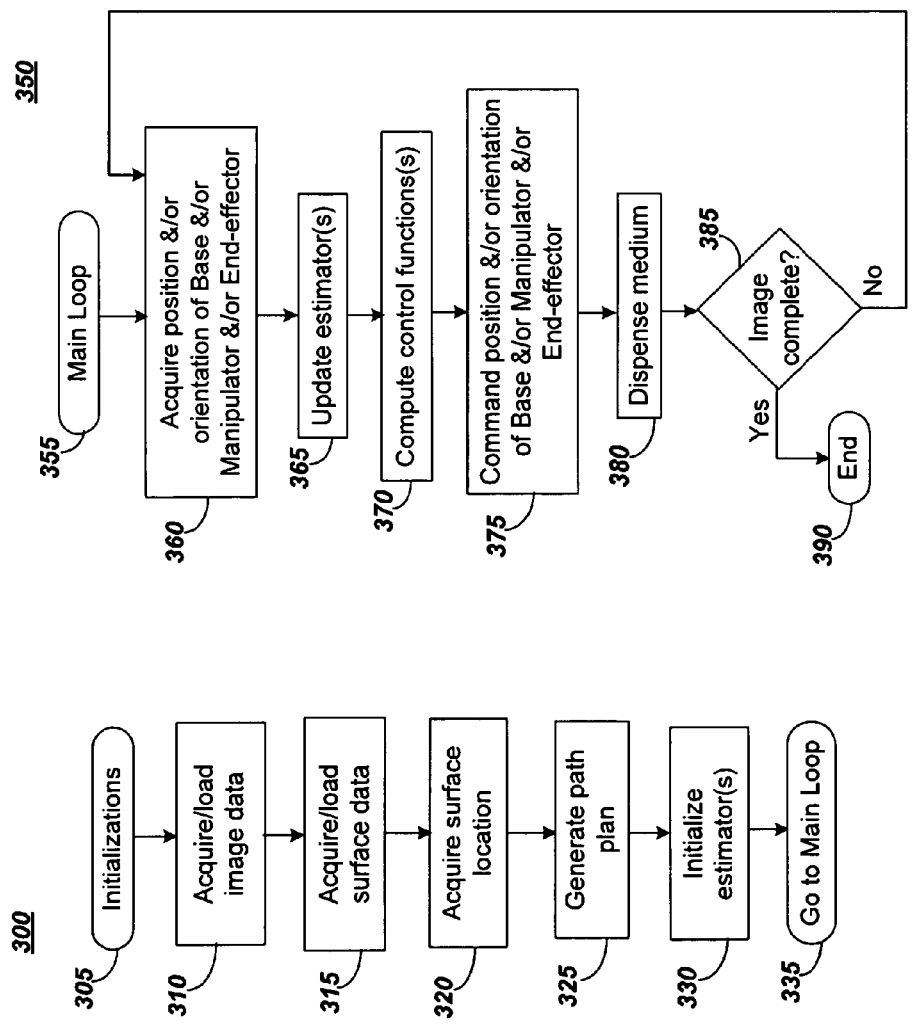

SYSTEM FOR AUTONOMOUSLY DISPENSING MEDIA ON LARGE SCALE SURFACES

FIELD OF THE INVENTION

This disclosure relates to a system, method and article for autonomously dispensing a medium on a relatively large surface.

BACKGROUND

Autonomously dispensing media on relatively large surfaces may present unique challenges. The relatively large surfaces may be three-dimensional. Relatively large surfaces may include billboards, motion picture, television and/or live theater sets and backdrops, surfaces of transportation vehicles, e.g., aircraft, water craft, trains and/or automobiles, buildings and/or fabrics. Whether dispensing ink, paint, dye, a coating or some other medium, it may be difficult to accurately apply the medium manually over the relatively large surface. When dispensing multiple layers, e.g., to generate images that may include multiple colors, accurate spatial registration may be important. Covering most or all of the surface may necessitate moving about the surface and the entire surface may not always be visible. This may create difficulties in registration and in generating the desired image, in general.

In some cases, a dispensed medium, environment and/or surface may be "dull, dirty and/or dangerous." In such cases, manually dispensing the medium may be undesirable. It may therefore be desirable to provide a method and system for dispensing a medium on relatively large three dimensional surfaces that includes automation, e.g., a programmable robot. The programmable robot may include an end-effector configured to dispense the medium, e.g., a print head configured to dispense ink.

It may be appreciated that programmable robots may be used in automated and/or semi-automated manufacturing systems. In some cases a programmable robot may be mounted on or may include an overhead gantry system. The overhead gantry system may necessarily be constructed with high accuracy to help provide acceptable accuracy for robotic manufacturing activities. In other words, the positioning accuracy of the programmable robot may depend on and/or be limited by the gantry system. It may be further appreciated that such a gantry system may be limited to a defined work space. In other words, the work space may be defined by the gantry system and its range of motion. Further, the gantry system itself may occupy a relatively large area thereby increasing the space required by the manufacturing system. It may also be appreciated that, once constructed, a gantry system may not be easily relocatable so that a manufacturing process may be limited to the location and range of motion of the gantry system, as constructed.

Accordingly, it may be desirable to provide a programmable robot whose positioning accuracy is relatively less reliant on the construction accuracy and/or tolerances of the gantry system. It may also be desirable, in some cases, to provide a programmable robot that is mounted on a mobile platform to avoid costs, space requirements and positioning limitations associated with a gantry system. A mobile platform may allow a programmable robot to operate in multiple locations It may be appreciated that using a programmable robot to dispense a medium on a relatively large three dimensional surface may also present challenges. For example, it may be desirable, depending on the medium being dispensed, to dispense the medium over a relatively limited time period. In order to achieve this, it may be desirable to move the end-effector, and therefore the robot, relatively quickly. It may be appreciated relatively quick movement combined with positioning accuracy may be difficult to achieve. It may also be appreciated that a positioning system may be subject to measurement noise in detecting position accurately and process noise in moving the end-effector. The positioning system may depend on a model of the programmable robot. The model may include inaccuracies that may affect positioning accuracy. Process noise and/or model error may depend on physical parameters associated with the robot. Measurement noise may depend on accuracy and/or resolution of position sensors and/or processing devices coupled to those sensors. Such noise may contribute to inaccuracy in positioning and orientation. It may therefore be desirable to include an estimate of end-effector position and/or orientation to reduce or eliminate the noise and/or model inaccuracy effects and thereby improve accuracy.

SUMMARY

The present disclosure relates in one embodiment to a system including a base and an end-effector configured to dispense a medium onto a surface having a width or a length of at least two meters. The system further includes a metrology system configured to measure a position and orientation corresponding to an actual position and orientation of the end-effector relative to the surface. The system further includes an autonomous controller configured to command the base and the end-effector to adjust the actual position and orientation of the end-effector based upon the measured position and orientation and to command the end-effector to dispense the medium onto the surface.

The present disclosure relates in another embodiment to a method for dispensing a medium onto a surface having a width or a length of at least two meters, including providing a base and an end-effector configured to dispense a medium onto the surface. The method further includes measuring a position and orientation corresponding to a position and orientation of the end-effector relative to the surface. The method further includes autonomously adjusting the position and the orientation of the end-effector based upon the measured position and orientation; and commanding the end-effector to dispense the medium onto the surface.

In yet another embodiment, the present disclosure relates to an article comprising a storage medium having stored thereon instructions that when executed by a machine result in the following operations: measuring a position and orientation corresponding to a position and orientation of the end-effector relative to a surface having a width or a length of at least two meters; autonomously adjusting the position and the orientation of the end-effector based upon the measured position and orientation; and commanding the end-effector to dispense the medium onto the surface.

BRIEF DESCRIPTION OF THE DRAWINGS

The detailed description below may be better understood with reference to the accompanying figures which are provided for illustrative purposes and are not to be considered as limiting any aspect of the invention.

FIGS. 3A through 3C depict exemplary flow charts consistent with the present disclosure.

DETAILED DESCRIPTION

Figure 1A:
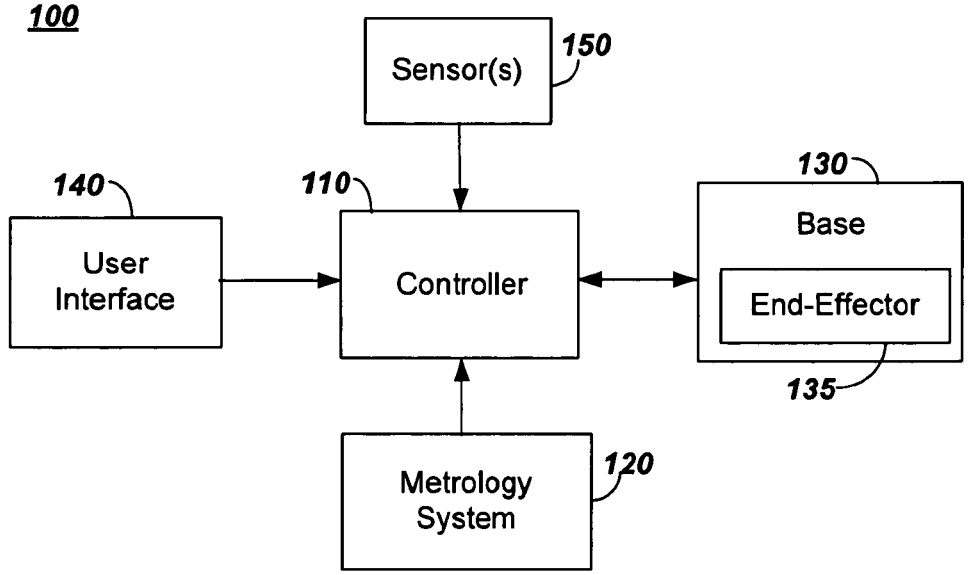
FIGS. 1A and 1B depict exemplary system block diagrams consistent with the present disclosure.

In general, the present disclosure describes a system (collection of devices) and method that may be used to autonomously and dynamically dispense a medium onto a relatively large surface relatively accurately. As used herein, "autonomously" may be understood as independently, without outside control from a human. As used herein, "relatively large" may be understood to include surfaces having a dimension, e.g., length and/or width, of at least about two meters. Accordingly, it is contemplated herein that relatively large surfaces may have a length and/or a width of two meters to three hundred meters, including all values and increments therein. The surface may be three-dimensional. By three-dimensional, it is meant that the surface includes at least one location that has a depth of at least about 1 mm (one millimeter).

The system may include a metrology system. The system and method may be configured to achieve a dynamic absolute accuracy (positioning of the end effector with respect to a location on a given surface from an initial location) that may approach a static absolute accuracy of the metrology system. The static absolute accuracy of an exemplary metrology system, e.g., a Metris iGPS™ metrology system sold by Metris of Belgium, may be about five thousandths of an inch (0.005") over about twenty meters and about ten thousandths of an inch (0.010") over about forty meters. Advantageously, the dynamic positioning accuracy may be limited only by the static accuracy of the metrology system. The system and method may achieve this accuracy over the relatively large surface autonomously.

The medium may be a liquid, solid and/or gas. The medium may be an image forming substance including ink, paint, powder, colorant, pigment and/or dye. Additionally or alternatively, the medium may be a surface coating substance such as powder, resin, thermoplastic, and/or foam. The medium may be configured to react with the surface and/or another medium, e.g., to form a coating, remove a coating and/or to change color. The medium may not be visible, i.e., its spectrum may not be in the visible range, but may be detectable.

A plurality of media may be dispensed sequentially, e.g., one medium at a time, and/or in parallel, e.g., a plurality of media dispensed substantially simultaneously. The plurality of media may combine before, during and/or after dispensing. Additionally or alternatively, the plurality of media may not combine, i.e., may remain distinct. Each medium may be dispensed over at least a portion of the surface. Media dispensed sequentially may be configured to form one or more layers. Each layer may be separate from and/or may combine with adjacent layers. For example, the layers of media may be configured to form a three-dimensional image on a three-dimensional surface.

The surface may be simple and/or complex. As used herein, a simple surface may be understood as a surface that may be defined by one or more parameters, e.g., curved with known or measurable radius or radii of curvature. As used herein, a complex three-dimensional surface may be understood as a surface that cannot easily be defined by a finite number of parameters. Such a surface may be characterized by a plurality of points located on the surface. Each point may be defined in one or more dimensions by a position relative to a common reference, e.g., origin of a coordinate system. A group of adjacent points may be interconnected by line segments to form a surface polygon. For example, a group of three points may form a triangle. A normal may be defined for each surface polygon. As used herein, a normal may be understood as a unit vector perpendicular to a tangent to a surface. A plurality of contiguous surface polygons may then correspond to a portion or all of the complex surface.

Figure 1B:
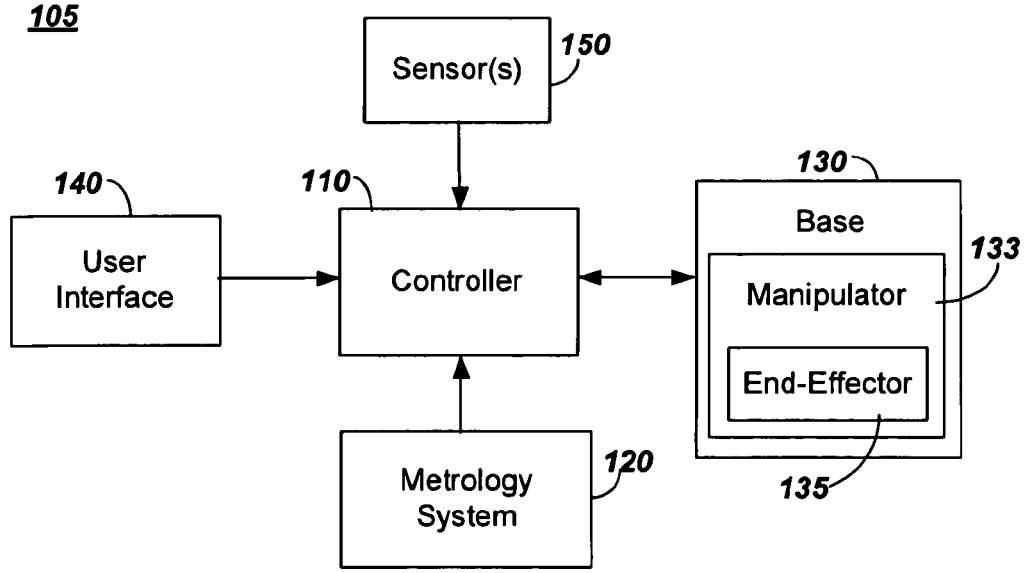

Attention is directed to FIGS. 1A and 1B which depict illustrative system block diagrams of autonomous dispensing systems 100, 105 consistent with the present disclosure. Each system 100, 105 may be configured to autonomously dispense a medium onto a relatively large surface relatively accurately. Each system 100, 105 may include a controller 110 coupled to a metrology system 120, a base 130, an end-effector 135 and/or a user interface 140. The end-effector 135 may be coupled to the base 130. As used herein, a controller may be understood to include pre-programmed hardware elements, firmware and/or a combination of hardware, software and firmware. The system 105 depicted in FIG. 1B may include a manipulator 133 coupled between the end-effector 135 and the base 130. In an embodiment, the systems 100, 105 may include one or more sensors 150, including one or more safety sensors.

As used herein, a metrology system, e.g., metrology system 120, may be understood as a system that is configured to measure a position and/or an orientation of an object. The object may include a base, a manipulator and/or an end-effector. As used herein, a base, e.g., base 130, may be understood as a device that may be configured to adjust a position of an end-effector and/or manipulator. For example, a base may be a wheeled platform. As used herein, a manipulator, e.g., manipulator 133, may be understood as a device configured to adjust a position of an end-effector relative to a base. The manipulator may include one or more joints configured to rotate about an axis and a link coupled to each of the one or more joints. As used herein, an end-effector, e.g., end-effector 135, may be understood as a device that may be coupled to a manipulator and/or a base and may be configured to dispense a medium, e.g., onto and/or near a surface. For example, an end-effector may include a print head, a paint spray gun, a nozzle, a jet, or the like.

The controller 110 may be configured to receive inputs from the metrology system 120, the base 130, the end-effector 135, the manipulator 133, if any, and/or the user interface 140. The metrology system 120 may be configured to measure a position and/or orientation of the base 130, manipulator 133 and/or end effector 135. The metrology system 120 may be further configured to provide the measured position and/or orientation to the controller 110. In an embodiment, the base 130, manipulator 133 and/or end-effector 135 may be configured to provide position and/or orientation data to the controller 110, independent of the metrology system, i.e., may be configured to provide redundant position and/or orientation data. For example, the manipulator 133 may include an encoder for each joint. The encoder may be configured to provide joint angle data to the controller 110. Additionally or alternatively, as discussed in more detail below, sensors may be provided to provide position and/or orientation data for the base 130, manipulator 133 and/or end-effector 135. As used herein, position may be understood as a location relative to a reference in three-dimensional space and orientation may be understood as an angle, e.g., about an axis, in three-dimensional space.

In some embodiments, the controller 110 may be configured to receive an input from one or more sensors 150. The sensors 150 may include safety sensors. The safety sensors may be configured to protect humans and/or the dispensing system 100, 105. In an embodiment, the sensors 150 may include an obstacle sensor configured to detect obstacles that may be in a path of the base 130, manipulator 133 and/or end-effector 135. For example, an obstacle sensor may be configured to provide an alarm signal to the controller 110, an audible alarm configured to notify a human and/or a halt signal to the base 130, manipulator 133 and/or end-effector 135, based on detection of an obstacle. In another embodiment, the sensors 150 may include a proximity sensor configured to detect a distance of the end-effector 135 from the surface and/or another object. For example, a proximity sensor may be configured to provide an alarm signal to the controller 110 if the end-effector 135 moves to less than a minimum distance from the surface or an obstacle.

Sensors 150 may further include base 130 wheel odometry that may be configured to provide a distance traveled by a wheel. In an embodiment, sensors 150 may include a sensor associated with an inertial measurement unit that may be configured to provide base 130, manipulator 133, and/or end-effector 135 translational (i.e., positional) and/or rotational (i.e., orientational) motion data, e.g., acceleration, rate and/or direction of translation and/or rotation. In another embodiment, sensors 150 may include angle sensors, e.g., encoders, configured to provide manipulator 133 joint and/or end-effector 135 angle data.

The controller 110 may be configured to receive and/or store image data and/or surface data. The user interface 140 may be used to provide the image data and/or surface data to the controller 110. The controller may be configured to receive and/or store a path plan. The path plan may define a desired trajectory of the base 130, manipulator 133 and/or end-effector 135 for dispensing a medium on a surface. As used herein, a trajectory may be understood as data representing a sequence of positions, orientations, translations and/or rotations of the base 130, manipulator 133 and/or end-effector 135.

The controller 110 may be configured to provide position and/or orientation commands to the base 130, manipulator 133 and/or end-effector 135 and/or dispensing commands to the end-effector 135. The commands may be based on position and/or orientation data received from the metrology system 120 and/or other sensors, image data, surface data and/or inputs from the user interface 140.

Figure 2A:
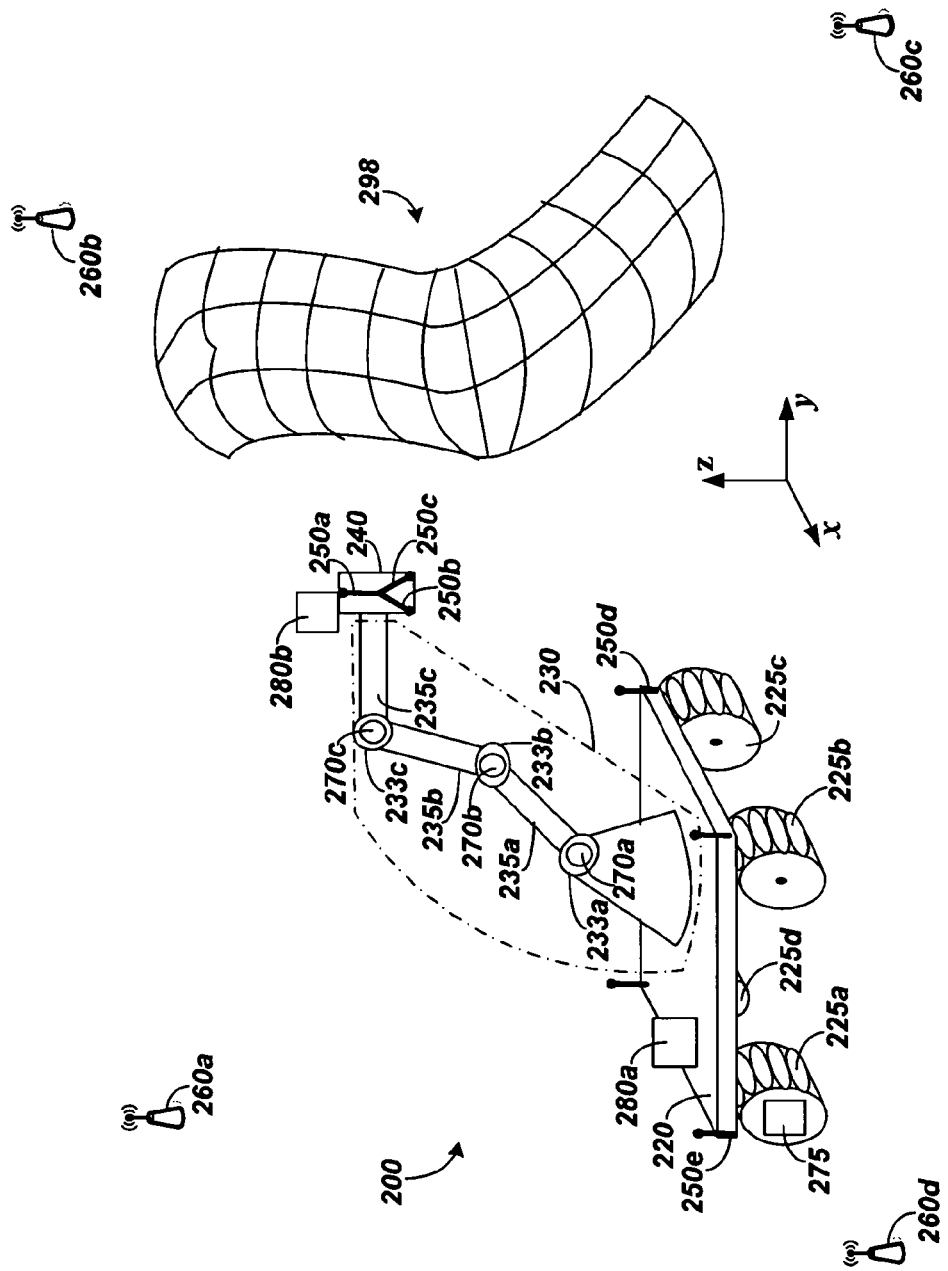
FIGS. 2A, 2B and 2C depict sketches of a first mobile platform system, an overhead gantry system and a second mobile platform system, respectively.
Figure 2B:
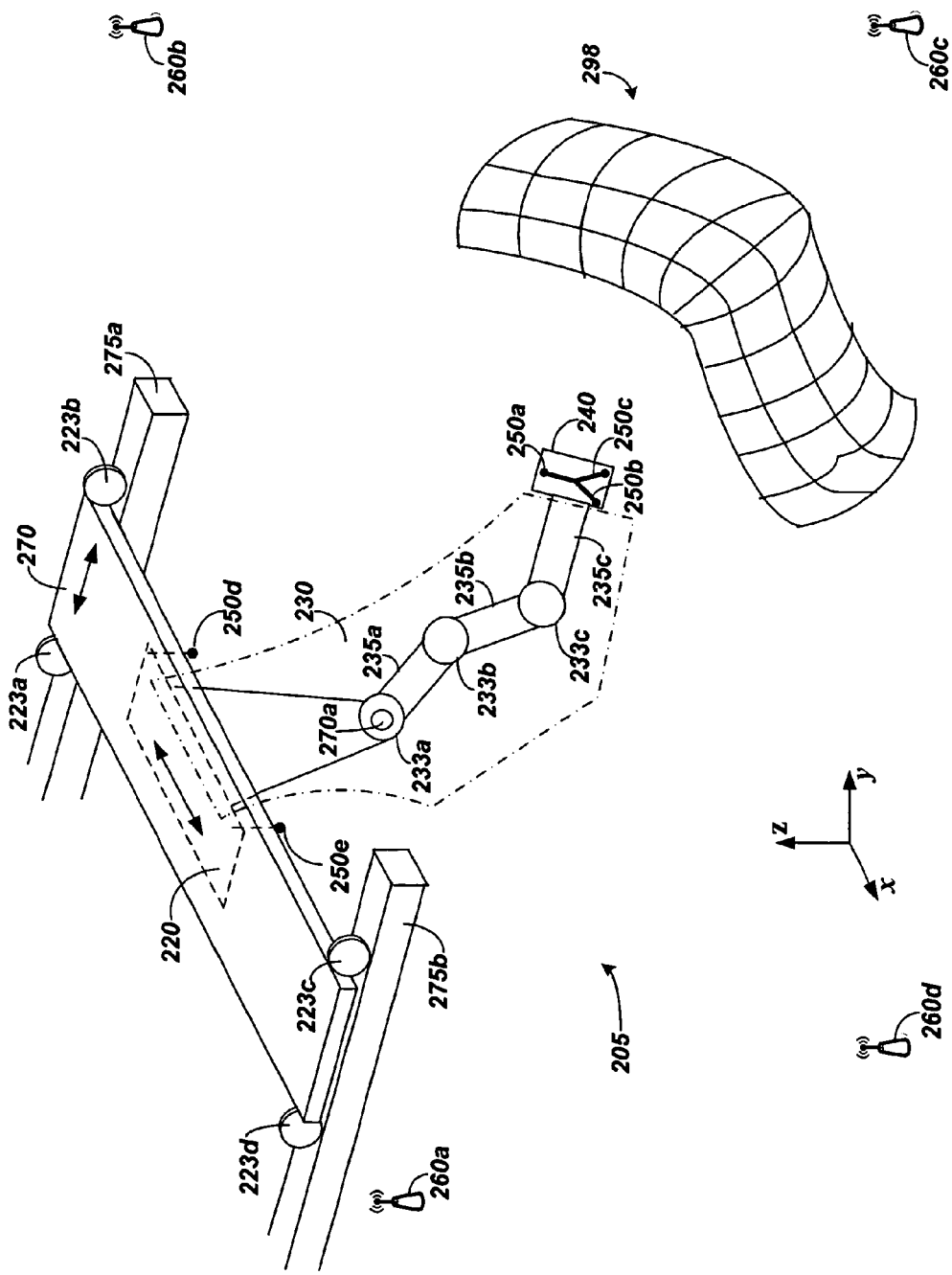
Figure 2C:
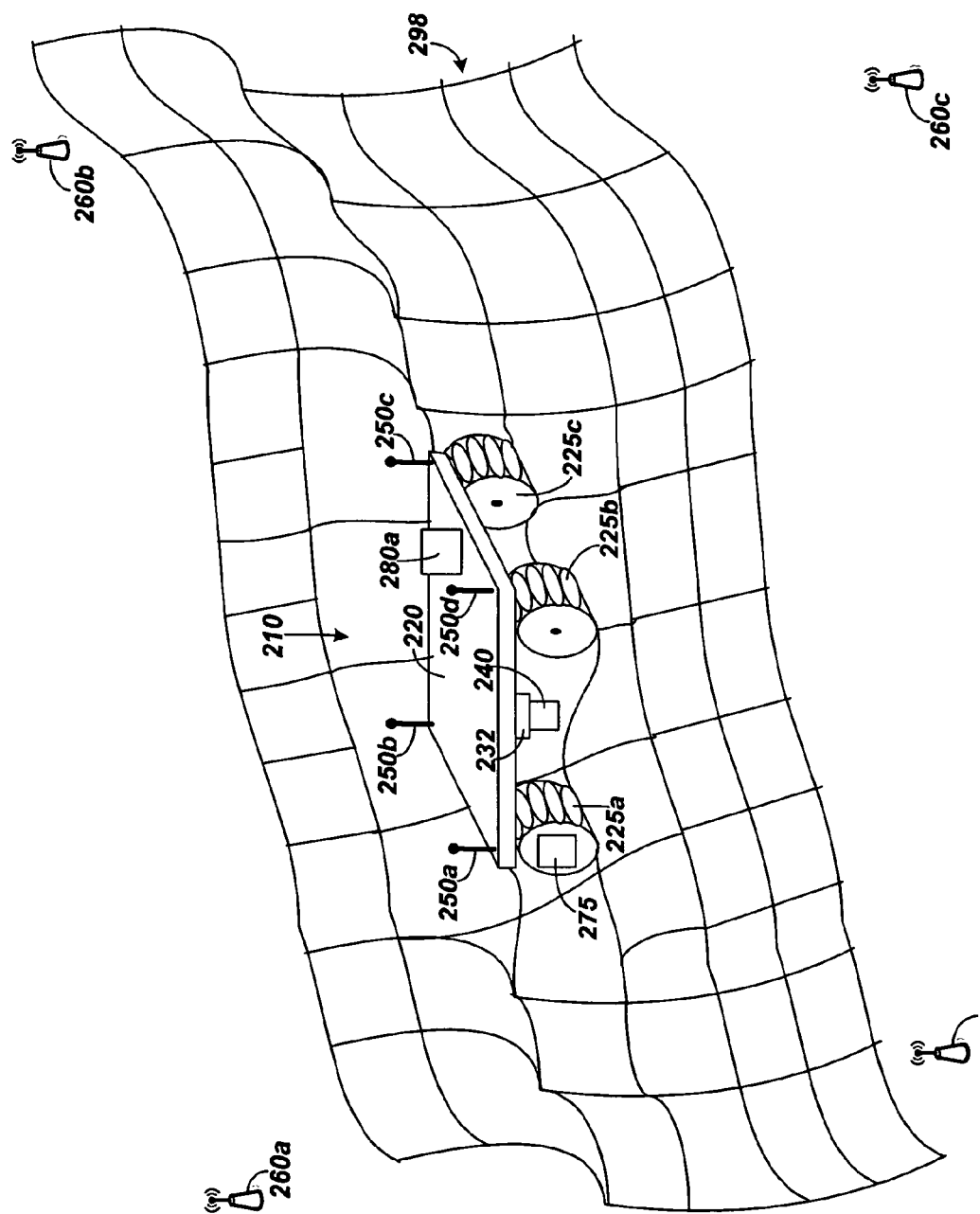

Attention is directed to FIGS. 2A, 2B and 2C which depict sketches of embodiments of autonomous dispensing systems consistent with the present disclosure. Each autonomous dispensing system may be located in and/or near a dispensing system work space. The embodiment depicted in FIG. 2A includes a first mobile platform system 200. The embodiment depicted in FIG. 2B includes a gantry system 205. The embodiment depicted in FIG. 2C includes a second mobile platform system 210. It may be appreciated that the first mobile platform system 200, the gantry system 205 and the second mobile platform system 210 may each be an embodiment of an autonomous robot. FIGS. 2A, 2B and 2C include an illustrative surface 298, configured to receive a medium dispensed by an autonomous robot. Each robot 200, 210, 205 may include a base 220 that may be coupled to an end-effector 240. The first mobile platform system 205 and/or the gantry system 210 may include a manipulator 230 coupled between the base 220 and the end-effector 240. The second mobile platform system 210 may include a joint 232 coupled between the base 220 and end-effector 240. The joint 232 may be a prismatic joint that may be configured to adjust a position of the end-effector 240 relative to the base 220.

The manipulator 230 may include a plurality of joints 233a, 233b, 233c and/or links 235a, 235b, 235c. Each joint 233a, 233b, 233c may be coupled to at least one link 235a, 235b, 235c. Each joint 233a, 233b, 233c may be configured to rotate about an axis which may result in a change in angle between adjacent links. As used herein, adjacent links may be understood as links that may be coupled to a joint. The manipulator 230 may be configured to be redundant, i.e., may have more than six degrees of freedom. In other words, a position and/or orientation of the end-effector 240 relative to the base 220 may not uniquely define a position and/or angle of a link 235a, 235b, 235c and/or joint 233a, 233b, 233c of the manipulator 230.

The base 220 of the first mobile platform system 200 and/or the second mobile platform system 210 may be mounted on wheels, e.g., wheels 225a, 225b, 225c, 225d. The base 220 may be configured to be holonomic, i.e., move in any direction. For example, the wheels 225a, 225b, 225c, 225d may be holonomic, e.g., mecanum wheels. It may be appreciated that the first and second mobile platform systems 200, 210 may have more or fewer wheels.

The base 220 of the gantry system 205 may be coupled to a bridge 270. The bridge 270 may be configured to move in a direction. For example, the bridge 270 may be mounted on wheels, e.g., wheels 223a, 223b, 223c, 223d. The wheels 223a, 223b, 223c, 223d may be configured to travel along a track, e.g. tracks 275a, 275b. Accordingly, the bridge 270 may move in a direction substantially parallel to an axis of the tracks 275a, 275b. The base 220 may be configured to move, relative to the bridge 270, in a direction that may be substantially perpendicular to the direction of movement of the bridge 270, i.e., in a direction that may be substantially perpendicular to the axis of the tracks 275a, 275b.

Each of the autonomous dispensing systems may further include components of a metrology system. Components of each metrology system may include one or more transmitters, receivers, detectors and/or fiducials (i.e., markers that may be detected by an appropriate sensor, e.g., camera). For example, the autonomous dispensing systems depicted in FIGS. 2A, 2B and 2C may include a plurality of transmitters 260a, 260b, 260c and 260d, positioned about the dispensing system work space. It may be appreciated that an accuracy of a metrology system may depend on a relative position of one or more transmitters, detectors and/or fiducials. The autonomous dispensing systems may further include a plurality of detectors 250a, 250b, 250c, . . . , positioned on and/or near the end-effector 240 and/or the base 220. It may be appreciated that the number of transmitters and/or detectors shown in the figures is merely illustrative. More or fewer transmitters, detectors and/or fiducials may be used. For example, the autonomous dispensing system depicted in FIG. 2C may include a plurality of detectors 250a, 250b, 250c, 250d positioned on or near the base 220. In this configuration, a detector placed on the end-effector 240 may not be "visible" to a transmitter 260a, 260b, 260c or 260d, therefore, detectors may not be positioned on the end-effector 240. It may be further appreciated that a transmitter may be positioned on the end-effector 240 and/or base 220 and a detector may be located in the dispensing system work space.

Each of the autonomous dispensing systems may further include sensors for detecting translational and/or rotational position and/or motion of the base 220, manipulator 230 and/or end-effector 240. For example, sensors may include base wheel odometry, e.g., odometry 275 that may be configured to provide a distance traveled by a wheel. In an embodiment, sensors may include an inertial measurement unit, e.g., IMU 280a, and/or second inertial measurement unit, e.g., IMU 280b, that may be configured to provide base 220 and/or end-effector 240 translational and/or rotational motion data. In another embodiment, sensors may include angle sensors, e.g., encoders 270a, 270b, 270c, that may be configured to provide manipulator joint 233a, 233b, 233c and/or end-effector 240 angle data.

It may be appreciated that in preparation for dispensing a medium onto a relatively large surface, the surface, e.g., three-dimensional surface 298, may be positioned in the dispensing system work space. The first mobile platform system 200, gantry system 205 and/or second mobile platform system 210 may be positioned relative to the surface 298. For example, the first mobile platform system 205 may be positioned near the surface and/or the second mobile platform system 210 may be positioned on the surface 298. In the case of the gantry system 205, the surface 298 may be positioned relative to the gantry system 205. The base 220 and/or end-effector 240 may be commanded to move within the dispensing system work space relative to the surface by a controller (not shown). The commanded movement may be based on a position and/or orientation of the base 220, bridge 270, manipulator 230 (e.g., joints and/or links) and/or end-effector 240. The position and/or orientation may be detected by the metrology system 120 and/or other sensors. The metrology system 120 and/or other sensors may provide a signal representing the position and/or orientation to the controller, e.g., controller 110.

Attention is directed to FIGS. 3A through 3C which depict exemplary flow charts consistent with the present disclosure. FIG. 3A depicts an exemplary initialization flow chart 300. FIG. 3B depicts an exemplary main loop 350 configured to position and/or orient a manipulator and/or end-effector and/or to dispense a medium. FIG. 3C depicts an exemplary sensor interrupt 340. As depicted in FIG. 3A, the initializations flow may begin at step 305, Initializations. Image data may then be acquired and/or loaded 310.

As used herein, image data may be understood as data that defines a distribution of a medium over a surface. For example, image data may include a distribution of colors corresponding to an image to be created on the surface. The image data may include a color associated with each surface element of the surface. In this example, the image may include, e.g., text, background, a scene, or the like. In another example, image data may include a thickness of a medium (e.g., volume per area) to be dispensed over a portion or all of a surface. It may be appreciated that image data may include a plurality of distributions of a medium over the surface and/or a plurality of distributions of a plurality of media over the surface.

Accordingly, image data may define a distribution of a medium over a surface. For example, for an image, image data may be acquired using a scanner that may convert the image to an array of pixels where each pixel may include a color value and/or a brightness value. Additionally or alternatively, image data that includes a thickness of a medium to be dispensed over a portion or all of a surface may be loaded. In other words, the image data may correspond to an image and/or to a thickness of a coating.

Surface data may then be acquired and/or loaded 315. It may be appreciated that the surface data may be acquired and/or loaded 315, prior to the image data being acquired and/or loaded 310. Additionally or alternatively, the surface data may be acquired and/or loaded 315 in parallel with the image data. The order shown in FIG. 3A is merely illustrative. Surface data that has been previously acquired may be loaded using, e.g., the user interface 140. Additionally or alternatively, surface data may be acquired.

Surface data may include data sufficient to define the surface. As discussed above, the surface may be simple and/or complex. A simple surface may be defined by a finite number of parameters, e.g., a position of center and radius of curvature for a curved surface. A finite number of parameters may be understood as a minimum number of parameters that may be used to generate the surface. For example, the position of center for a curved surface may be defined in three dimensions relative to an origin. The simple surface may be further defined by a relative position of an edge of the surface. A complex surface may be defined by a plurality of points (i.e., a coordinate that identifies a location on a surface), e.g., a point cloud. Each point in the point cloud may be associated with a position relative to a reference, i.e., a fiducial. As used herein, a fiducial may be understood as a reference, e.g., fixed points or lines to which other points may be related. For example, an edge of a surface may provide a fiducial for that surface. A three-dimensional surface may then be reconstructed of surface polygons defined by points in the point cloud.

Once the surface has been defined a surface data file may be generated based upon the definition of the surface. For a simple surface, the surface data file may be generated based upon the above referenced parameters defining a simple surface. For a complex surface, the surface data file may be generated based upon the above referenced point cloud.

As discussed above, for simple surfaces, a finite number of parameters may specify the surface. These parameters may be entered using, e.g., the user interface 140. For a complex three-dimensional surface, a scanner may be used to generate an array of points corresponding to the complex three-dimensional surface. The scanner may be a laser scanner that uses incident and reflected laser light to analyze a surface. For example, the scanner may be a laser scanner that uses coherent laser radar such as from Metris of Belgium. Additionally or alternatively, a structured light and/or modulated light three-dimensional scanner may be used. For example, the scanner may use dynamic structured light for measuring a surface profile as disclosed in U.S. Pat. No. 7,061,628, the contents of which are incorporated herein by reference in their entirety. Additionally or alternatively, a lidar (Light Detection and Ranging) system may be used.

It may be appreciated that an image to be dispensed may be defined in two dimensions. It may be further appreciated that the two dimensions may generally correspond to a two-dimensional surface. Accordingly, two-dimensional image data may be further processed prior to being dispensed over a three-dimensional surface. For example, further processing may include distorting the two-dimensional image data to correspond to the three-dimensional surface. In other words, one portion of the two-dimensional image may cover a relatively larger portion of the three-dimensional surface while another portion of the two-dimensional image may cover a relatively smaller portion of the three-dimensional surface.

It may be appreciated that a surface may be defined prior to the surface being positioned and/or oriented in a dispensing system space. As used herein, dispensing system space may be understood as a reference frame in which the base and/or end-effector may operate. The reference frame may provide an origin and a coordinate system for the base and/or end-effector. The surface may then be located in dispensing system space. The position and/or orientation of the surface may then be detected. For example, for a complex surface, a position and/or orientation of a fiducial may be detected. In another example, a plurality of points on the surface may be detected and the position and/or orientation of the surface may then be specified. Accordingly, surface data may include data defining the surface and data that specifies the position and/or orientation of the surface within the dispensing system space.

Surface position may then be acquired 320. As discussed above, a 3D surface may be positioned and/or oriented in the dispensing system space (reference frame). Acquiring surface position 320 may include analyzing a position and/or orientation of the surface relative to the reference frame. For example, the parameters corresponding to a simple surface may be evaluated relative to the reference frame. For a complex surface, one or more points, e.g., corresponding to a fiducial, may be acquired that may then be used to determine the position and/or orientation of the surface in the dispensing system space.

It may be appreciated that the surface data and/or the image data may be acquired prior to initiating the flow illustrated in FIG. 3A. Accordingly, data acquired previously may be loaded at step 310 and/or step 315. It may be further appreciated that an order of the steps in the initialization flow chart 300 may be varied without deviating from the scope of the present disclosure. For example, image data may be acquired and/or loaded 310 after surface data has been acquired and/or loaded 315 and/or after surface position has been acquired 320.

A path plan may then be generated 325. As used herein, path plan may be understood to include a desired translational and/or rotational motion and/or position (and/or orientation) of the base 130 and/or end-effector 135 in the dispensing system space. The path plan may include a desired trajectory, including velocity and/or acceleration, of the base 130 and/or end-effector 135. The path plan may be based on the image data, the surface data, the surface position and/or orientation in the dispensing system space and/or base, manipulator and/ or end-effector characteristics. In an embodiment, the path plan may include obstacle avoidance for obstacles that may be present in the dispensing system space. In another embodiment, the path plan may be viewable and/or modifiable by a user, using e.g., the user interface 140. In yet another embodiment, the path plan may be configured to avoid singularities that may result in a loss of a degree of freedom of the manipulator 133. As used herein, a singularity may be understood as an end-effector position that may be achieved by more than one combination of positions and/or orientations of manipulator 133 components (i.e., joints and/or links). For example, a joint angle of the manipulator in the path plan may be adjusted to avoid the singularity.

In an embodiment, the path plan may be updated dynamically, i.e., may be updated in the main loop 350. For example, in a system where dynamic accuracy may be important, feedforward control may be utilized. It may be appreciated that feedforward control techniques may provide improved dynamic accuracy by responding to a change in a parameter before the change affects an output, i.e., more quickly than feedback control techniques. In an embodiment, feedforward control may include dynamic path replanning (e.g., a preview-based model inversion using, for example, a method of calculated torques). In this embodiment, an initial path plan may be generated as part of the initialization flow, e.g., step 325. The initial path plan may then be replanned, i.e., adjusted, as dispensing progresses, e.g., in the main loop 350. The adjusted path plan may then be configured to compensate for error between the initial path plan and an estimated state.

In this embodiment, the path plan may be updated between steps 365 and 370 of the main loop (discussed below). It may be appreciated that there are a variety of feedforward control techniques that may be utilized. For example, another embodiment may include stabilized feedforward control in which the initial path plan is not adjusted rather, the feedforward control may be stabilized using a feedback loop.

The base, manipulator and/or end-effector estimators may then be initialized 330. For example, states (defined below) to be estimated may be initialized, time may be set to T0 and estimator error matrices, e.g., variance and/or covariance matrices, may be initialized. The estimator error matrices may be based on process and/or measurement noise characteristics. Flow may then proceed 335 to the main loop 350.

Figure 4:
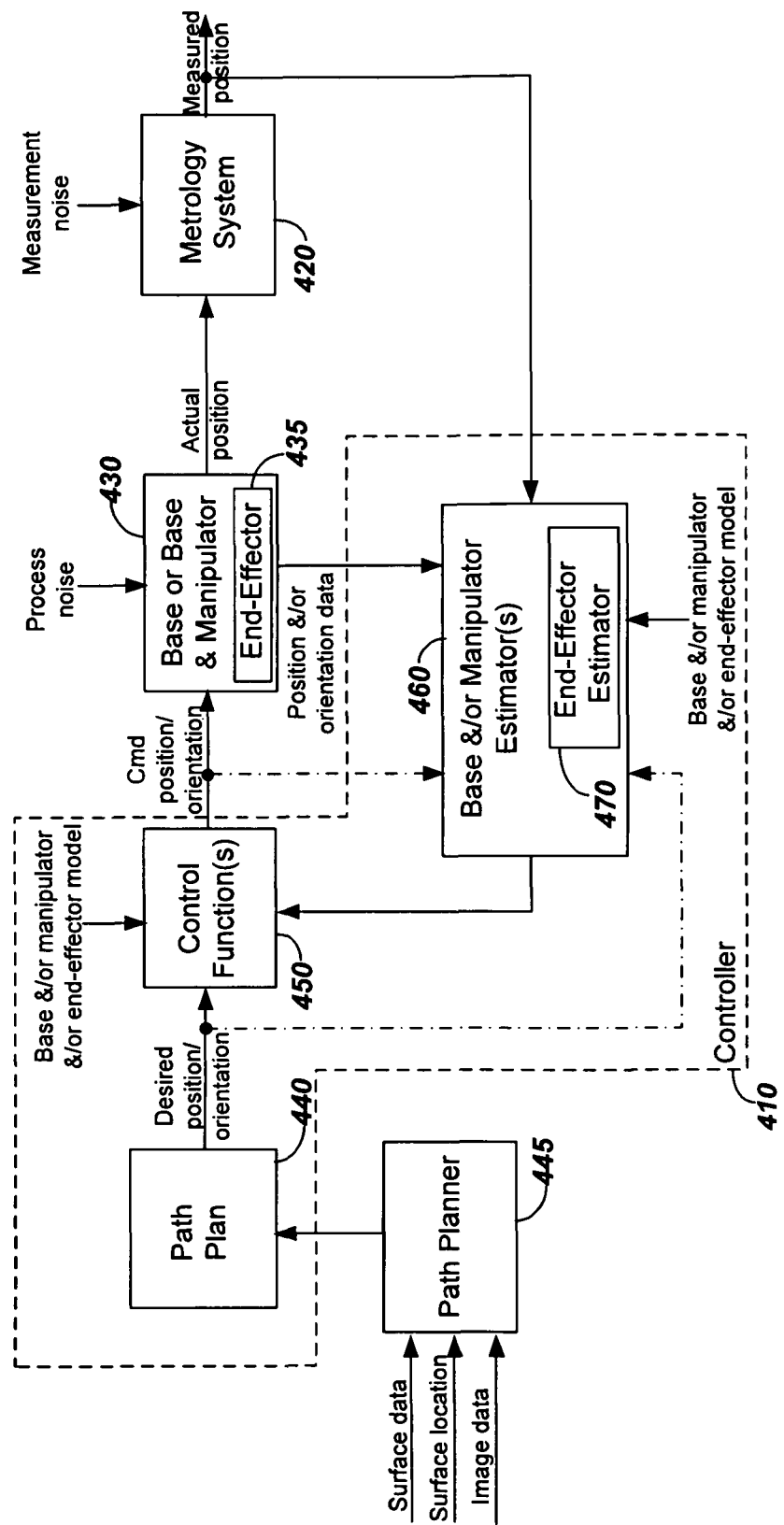
FIG. 4 depicts an exemplary control system block diagram consistent with the present disclosure.

Attention is directed to FIG. 3B and FIG. 4. FIG. 3B depicts the exemplary main loop 350 for dispensing a medium onto a surface. FIG. 4 depicts an exemplary control system block diagram 400 consistent with the present disclosure. In an embodiment, the exemplary main loop 350 may be implemented using a controller, e.g., controller 410. The controller 410 may include a path plan 440, control function(s) 450, a base and/or manipulator estimator 460 and/or an end-effector estimator 470. The controller 410 may be configured to provide position and/or orientation commands to a base or base and manipulator 430 and/or an end-effector 435 based on the path plan 440, control function(s) 450, base and/or manipulator estimator 460 and/or the end-effector estimator 470. The controller 410 may be configured to receive data corresponding to position and/or orientation of the base or base and manipulator 430 and/or end-effector 435 from the base or base and manipulator 430, end-effector 435 and/or a metrology system 420. It may be appreciated that data corresponding to position and/or orientation not provided by the metrology system 420 may be provided by sensors, as discussed above. The sensors are not shown explicitly in FIG. 4 for clarity.

The path plan 440 may be generated by a path planner 445, e.g., at step 325 of the initialization flow and may be based, at least in part, on 3D surface data, 3D surface location in the dispensing system space and/or image data. It may be appreciated that the path planner 445 may be included in the controller 410. Additionally or alternatively, the path planner 445 may be independent of the controller 410. The path plan 440 may then be generated independently and stored in the controller 410.

Main loop program flow 350 may begin at step 355, Main Loop. The position and/or orientation of a base, manipulator and/or end-effector, e.g., base or base and manipulator 430 and/or end-effector 435, may then be acquired 360. In an embodiment, the position and/or orientation of the base or base and manipulator 430 and/or end-effector 435 may be acquired, i.e., measured, by the metrology system 420. For example, a metrology system may include a laser transmitter and/or receiver. A Metris iGPS™ system, sold by Metris of Belgium may be an example of such a laser-based metrology system.

It may be appreciated that a metrology system, e.g., metrology system 420, may have an associated static accuracy. For example, for the Metris iGPS™ system discussed above may have a static absolute accuracy of about five thousandths of an inch over about twenty meters and about ten thousandths of an inch over about forty meters. As used herein, associated static accuracy may be understood as, e.g., a measure of a difference between an actual position of an object and a measurement of the position of the object when the object is not moving relative to the metrology system. It may be further appreciated that the static accuracy may be "better", i.e., generally more accurate, than a dynamic accuracy. It may be further appreciated that an automated dispensing system consistent with the present disclosure may be configured to dispense a medium dynamically. In other words, the dispensing system may be configured to dispense the medium while the end-effector 435 is in motion and/or while the end-effector 435 is stopped for a time period corresponding to a medium dispensing time. In such a configuration, the metrology system, e.g., metrology system 420, may be capable of measuring e.g., position with dynamic accuracy, i.e., with an accuracy that may be less accurate than static accuracy. The measurement accuracy may be improved with additional position and/or orientation measurements.

Accordingly, in another embodiment, data corresponding to the position and/or orientation of the base or base and manipulator 430 and/or end-effector 435 may be provided by sensors associated with the base or base and manipulator 430 and/or end-effector 435. For example, data corresponding to position may be provided by base wheel odometry (i.e., distance travelled by each wheel), e.g., odometry 275, and/or data corresponding to orientation may be provided by joint angle encoders, e.g., encoders 270a, 270b, 270c. Additionally or alternatively, an inertial measurement unit (IMU), e.g., IMUs 280a, 280b, may be configured to provide translational (i.e., positional) and/or rotational (i.e., orientational) motion data, e.g., acceleration, rate and/or direction of translation and/or rotation. Additionally or alternatively, angle sensors, e.g., encoders, 270a, 270b, 270c, may be configured to provide manipulator joint and/or end-effector 435 angle (i.e., orientation) data.

The position and/or orientation data may then be provided to the controller 410 and thereby to the base and/or manipulator estimator(s) 460 and/or the end-effector estimator 470. The estimators, e.g., base and/or manipulator estimator(s) 460 and/or end-effector estimator 470, may then be updated 365.

It may be appreciated that a measured position and/or orientation of a base, manipulator and/or end-effector may differ from an actual position and/or orientation. This difference, i.e., position and/or orientation error, may depend on measurement noise and/or measurement error. The error may affect an accuracy, e.g., position and/or orientation of a dispensing system. Accuracy may also depend on system dynamics, e.g., translational and/or rotational velocity and/or acceleration of inertial elements. An estimator, e.g., base and/or manipulator estimator(s) 460 and/or end-effector estimator 470, may be configured to provide improved positional and/or orientational accuracy.

As used herein, an estimator may be understood as a function that may be configured to provide an estimate of a state of a system based on a measurement of an output of the system, system and measurement dynamics, system noise(s), measurement error and/or initial conditions. For example, the system may be a collection of devices configured to autonomously and dynamically dispense a medium onto a relatively large surface. System and measurement dynamics, system noise, measurement error and/or initial conditions may be included in a model of the system. As used herein, a state of a system may be understood to include a position (e.g., x, y, z), velocity and/or acceleration, an orientation, i.e., angular position (e.g., pitch, roll, yaw), an angular velocity and/or an angular acceleration of an inertial element of the system. As used herein, yaw may be understood as rotation in an xy plane, perpendicular to a z-axis, in an xyz coordinate system. An inertial element may be understood as an element with a nonzero mass. Inertial elements may include a base, a wheel, a link, a joint and/or an end-effector. Accordingly, a state of a system may include a variable corresponding to a translational and/or rotational position and/or motion of an inertial element of the system. It may be appreciated that an output of a system may also be a state of a system.

A number of states may correspond to a number of degrees of freedom of the element. For example, an end-effector may have six degrees of freedom. Each degree of freedom may be associated with a positional (e.g., x, y, z) and/or angular (e.g., $\phi$, $\theta$, $\psi$) coordinate. The end-effector may then have twelve associated states, i.e., position (three states), angular position (three states), velocity (three states) and angular velocity (three states). In another example, a base may have three degrees of freedom, e.g., x, y, yaw. The base may then have six associated states: x and y position; x and y velocity and yaw (angular position) and angular velocity.

It may be appreciated that the number of degrees of freedom and/or number of states may depend on a particular configuration of base, manipulator and/or end-effector. It may be further appreciated that the number of degrees of freedom may not uniquely specify the particular configuration. For example, a manipulator with a plurality of degrees of freedom may include a plurality of revolute joints (joints that rotate in one angular direction) and/or a joint that rotates in a plurality of directions to achieve the plurality of degrees of freedom.

For example, a base, e.g., base 220 associated with the first and/or second mobile platform systems 200, 210, may have three degrees of freedom: x, y and yaw and may have six states: x position, y position, yaw angle, velocity in the x direction, velocity in the y direction, and angular velocity in the yaw direction. The degrees of freedom for the base 220 may also correspond to outputs, i.e., x, y and yaw. In another example, a base, e.g., base 220 associated with the gantry system 205 depicted in FIG. 2B may have two degrees of freedom: x position and y position and four states: x position, y position, velocity in the x direction and velocity in the y direction. It may be appreciated that the base 220 associated with the gantry system 205 may not rotate relative to the dispensing system space and may therefore not have a degree of freedom associated with a yaw angle. The base 220 associated with the gantry system 205 may then have two outputs corresponding to the degrees of freedom: x position and y position.

In another example, an end-effector, e.g., end-effector 240 associated with the first mobile platform system 200 and/or the gantry system 205, may have six degrees of freedom: x, y and z positions and pitch, roll and yaw angles. It may be appreciated that the degrees of freedom of an end-effector, e.g., end-effector 240, may depend on the degrees of freedom of a manipulator, e.g., manipulator 230. It may be further appreciated that the degrees of freedom and/or states of a manipulator may depend on a configuration of the manipulator. A manipulator, e.g., manipulator 230, may then have six degrees of freedom and twelve associated states: x, y and z positions; pitch, roll and yaw angles; velocities in the x, y and z directions; and angular velocities associated with the pitch, roll and yaw angles. Outputs may include the six degrees of freedom of the end-effector 240.

In yet another example, an end-effector, e.g., end-effector 240 associated with the second mobile platform system 210, may have similar degrees of freedom, states and/or outputs as the base 220 may have. In this example, a position and/or orientation of the end-effector may be fixed relative to the base 220. In another example, and end-effector, e.g., end-effector 240, may have an additional degree of freedom, e.g., in the z-direction. For example, a position of the end-effector 240, e.g., in the z-direction, may be adjustable relative to the base 220. In this example, the end-effector 240 may have similar degrees of freedom, states and/or outputs as the base 220 may have and, may have an additional degree of freedom (z-direction), an additional output (z-position) and two additional states (z position and velocity in the z direction).

It may be further appreciated that not all states associated with a physical system may be detected, i.e., measured. For example, it may be cost-prohibitive to provide sensors to sense all the states associated with the physical system and may be prohibitively computationally intensive to process all the data associated with the sensors in real time. Additionally or alternatively, measured states may include measurement noise and/or measurement error and a physical plant, e.g., base, manipulator and/or end-effector, may include process noise. For example, measurement error may depend on system dynamics, e.g., the speed at which a base, manipulator and/or end-effector may be moving. It may be further appreciated that an estimator may be used to provide an estimate of a state, e.g., position and/or orientation of a base, manipulator and/or end-effector, when the state is not measured or when the state is measured and the measurement includes noise and/or error. An estimator may then be used to reduce position and/or orientation errors.

In an embodiment, an estimator, e.g., base and/or manipulator estimator(s) 460 and/or end-effector estimator 470, may be configured to receive a plurality of measurements of an output of a system. For example, an output of the system may be a position and/or orientation of a base and/or a position and/or orientation of an end-effector, e.g., base 220 and/or end-effector 240. Measurements corresponding to the position and/or orientation of the base 220 may include a first measurement based on a signal from a metrology system, e.g., metrology system 120 and a second measurement based on wheel odometry and/or data from a first inertial measurement unit. Measurements corresponding to the position and/or orientation of the end-effector 240 may include a first measurement based on a signal from the metrology system 120 and a second measurement based on a signal from a joint angle decoder and/or data from a second inertial measurement unit. Based on the plurality of measurements, the estimator may provide a more accurate estimate of a state associated with an output than may be provided with one measurement.

The estimators, e.g., estimators 460, 470 may be configured to continue estimating states if a measurement data stream is interrupted. For example, the system may be configured to continue estimating states until a maximum error threshold is reached, i.e., a difference between a commanded position and/or orientation and a measured position and/or orientation. As discussed above, a system that includes a metrology system and an IMU, e.g., IMUs 280a, 280b, an angle encoder, e.g., encoders, 270a, 270b, 270c, and/or wheel odometry, e.g., odometry 275, may be configured to provide redundant measured position and/or orientation data. In such a configuration, a measurement data stream may be temporarily interrupted without complete loss of base, manipulator and/or end-effector position data. If the interruption is too long and/or multiple measurement data streams are interrupted, position error may increase. If the maximum error threshold is reached, the system may be configured to stop the base, manipulator and/or end-effector and/or to communicate, via e.g., the user interface that an error has occurred.

It may be appreciated that an estimator, as described herein, may be a recursive state estimator for a nonlinear system. As used herein a recursive state estimator may be understood as a function that provides an estimate a state of a system based on a prior estimate of the state and a current measurement. In other words, knowledge of the state of the system at all prior times is not required. The estimate may be based on a model of the system and a prior control input, if any.

A variety of estimators may be used to estimate the base, manipulator and/or end-effector states. As may be appreciated by those of ordinary skill in the art, examples of estimators may include Kalman Filters (linear system, additive Gaussian noise), Extended Kalman Filters (nonlinear system, additive Gaussian noise), Particle Filters (also known as Sequential Monte Carlo Methods; nonlinear system, non-additive and/or non-Gaussian noise) and Square Root Filters. For example, in an embodiment, noise may be modeled and/or approximated as Gaussian, white noise. In this embodiment, the Extended Kalman Filter may be used to estimate states of the base, manipulator and/or end-effector. In other embodiments, noise may be nonlinear, i.e., may not be Gaussian and/or may not be additive. In such embodiments, Particle Filters may be used to estimate states of the base, manipulator and/or end-effector.

Returning to FIG. 4, the estimators 460, 470 may include base, manipulator and/or end-effector models based, at least in part, on base, manipulator and/or end-effector physical characteristics. For example, the estimators 460, 470 may include inverse kinematic and/or dynamic models of the manipulator and/or end-effector. As used herein, kinematic may be understood as relating to a motion of a body without reference to a force causing the motion and/or without reference to a mass of the body. As used herein, dynamic may be understood as relating to the motion of the body including force and mass. As used herein, an inverse kinematic and/or dynamic model may be understood as a relationship between joint and/or link variables and a target position and/or orientation of a manipulator and/or end-effector. In other words, an inverse kinematic and/or dynamic model may be used to determine associated values for joint and/or link variables that correspond to the target position and/or orientation of the manipulator and/or end-effector. For example, an estimate may be based on x and/or y forces and/or yaw torque that may be associated with a base, e.g., base 220 and/or disturbances based on a dispensing process that may be associated with an end-effector, e.g., end-effector 240. The estimate may be further based on force associated with gravity. In an embodiment that includes a manipulator, the estimate may be based on joint torques in a generalized coordinate system that may be associated with the manipulator joint and/or link.

Manipulator and/or end-effector physical characteristics may include link and/or joint constraints, e.g., degrees of freedom, and/or static, kinematic and/or dynamic characteristics. The characteristics may include Denavit-Hartenberg parameters, e.g., Jacobian (velocity) and Hessian (acceleration) tensors. As used herein, Denavit-Hartenberg parameters may be understood as link and/or joint parameters based on link coordinate frames that have been selected according to the Denavit-Hartenberg convention. It may be appreciated that link coordinate frames may be referenced to links and are not necessarily referenced to the dispensing system space (reference frame). It may be further appreciated that the Denavit-Hartenberg parameters may be kinematic parameters. Manipulator characteristics may include link-wise inertial tensors and/or link-wise stiffness tensors.

The estimators 460, 470 may be further configured to receive desired position and/or orientation data based on the path plan 440. Additionally or alternatively, the estimators 460, 470 may be configured to receive command position and/or orientation data from a control function, e.g., control function(s) 450. The command position and/or orientation data may be based on the path plan 440. Whether the estimators 460, 470 receive desired position and/or orientation data or commanded position and/or orientation data may depend on a configuration of the base or base and manipulator 430, end-effector 435 and/or control function(s) 450.

Accordingly, at step 365, estimator(s), e.g. base and/or manipulator estimator(s) 460 and/or end-effector estimator 470, may be updated based, at least in part, on measurement data, base, manipulator and/or end-effector models, noise characteristics, and/or a desired position and/or orientation. Measurement data may include a measured position and/or an orientation of the base or base and manipulator 430 and/or end-effector 435. A control function, e.g., control function(s) 450, may be configured to receive the desired position, orientation and/or motion data based on the path plan 440, e.g., the path plan generated at step 325. The control function 450 may be further configured to receive estimates of position and/or orientation ("pose") of the base or base and manipulator 430 from the manipulator and/or base estimator(s) 460 and estimates of position and/or orientation of the end-effector 435 from the end-effector estimator 470. Control function (s) may then be computed 370. The control function(s) 450 may be based, at least in part, on base, manipulator and/or end-effector models, as discussed above with respect to the estimators 460, 470.

A position and/or orientation of a base, manipulator and/or end-effector, e.g., base or base and manipulator 430 and/or end-effector 435, may then be commanded 375. In other words, the base or base and manipulator 430 and/or end-effector 435 may be commanded to move from a current position and/or orientation to a next position and/or orientation, based on a result of the control function(s) computation 370. The command may be constrained by physical characteristics of the base, manipulator and/or end-effector. Accordingly, the output of the control function may include velocity and/or acceleration constraints (i.e., dynamic constraints).

The base or base and manipulator 430 and/or end-effector 435 may be configured to receive the command from the control function(s) 450. It may be appreciated that a commanded position and/or orientation of the base or base and manipulator 430 and/or end-effector 435 may differ from an actual position and/or orientation. This difference, i.e., position and/or orientation error, may depend on process noise and/or process error. The error (i.e., difference between commanded position and/or orientation and actual position and/or orientation) may affect an accuracy, e.g., position and/or orientation of a dispensing system. An estimator, e.g., base and/or manipulator estimator(s) 460 and/or end-effector estimator 470, may be configured to provide improved positional and/or orientational accuracy in the presence of process noise.

A medium may then be dispensed 380. Whether the image is complete may then be determined 385. If the image is complete, the flow may end 390. If the image is not complete, a next position and/orientation of the base, manipulator and/or end-effector may be acquired 360. Flow may continue in the main loop 350 until the image is complete.

Accordingly, as shown in FIG. 4, the path plan 440 may provide desired position and/or orientation data, based on the surface data and/or the image data, to the control function 450 and/or the estimators 460, 470. The control function 450 may then provide position and/or orientation commands to the base or base and manipulator 430 and/or end-effector 430 based on the desired position and/or orientation data and/or estimates of the position and/or orientation of the base, manipulator and/or end-effector. As discussed above, the manipulator 430, end-effector 435 and/or metrology system 420 may be subject to process and/or measurement noise. The estimators 460, 470 may be configured to reduce the effects of the noise(s) and thereby reduce position and/or orientation errors and improve the accuracy of the dispensing system.

Attention is directed to FIG. 3C. It may be appreciated that an automated dispensing system as described herein may be configured to operate in a environment that may include humans. It may be further appreciated that failure modes may be present in a system such as the automated dispensing system described herein. It may be advantageous to provide one or more sensors, configured to detect and respond to potential hazards. Accordingly, some embodiments may include the sensor interrupt 340 function depicted in FIG. 3C. As depicted, for example, in FIGS. 1A and 1B, a system 100, 105 may include one or more sensors 150. As discussed above, sensors may include, e.g., proximity sensors and/or obstacle sensors. In these embodiments, if an obstacle sensor detects an obstacle in the path of a base, manipulator and/or end-effector, e.g., base 220, manipulator 230 and/or end-effector 240, the obstacle sensor may be configured to signal the controller 410. The controller 410 may be configured to interrupt program flow, e.g. main loop flow 350 when such a signal is received. Motion of the base 220, manipulator 230 and/or end-effector 240 may be stopped in response to such a signal. It may be appreciated that, additionally or alternatively, in some embodiments, a sensor may be polled for status, e.g., in the main loop 350, rather than triggering interrupts.

Figure 5:
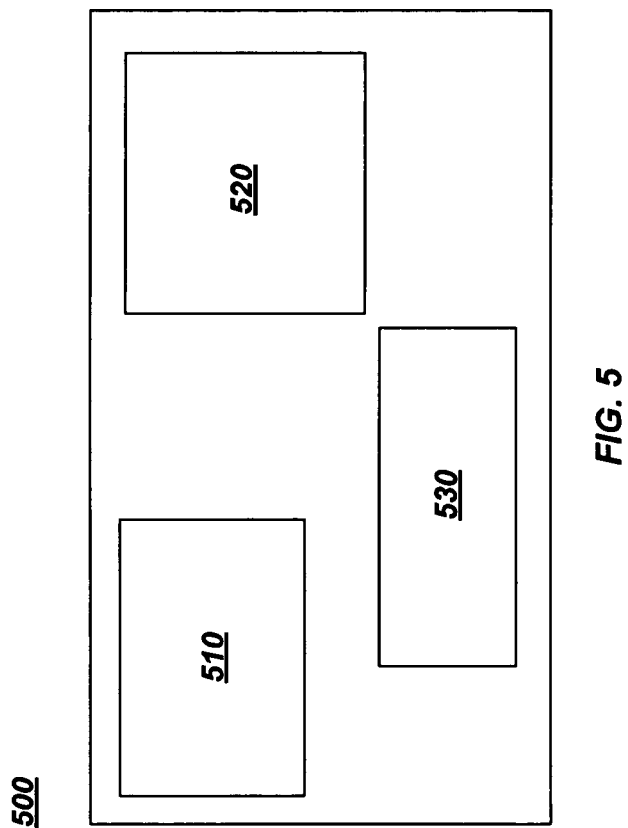
FIG. 5 illustrates an example of a system for dispensing a medium on a large scale three dimensional surface that contains a processor, machine readable media and a user interface.

It should also be appreciated that the functionality described herein for the embodiments of the present invention may be implemented by using hardware, software, or a combination of hardware and software, as desired. If implemented by software, a processor and a machine readable medium are required. The processor may be any type of processor capable of providing the speed and functionality required by the embodiments of the invention. Machine-readable memory includes any media capable of storing instructions adapted to be executed by a processor. Some examples of such memory include, but are not limited to, read-only memory (ROM), random-access memory (RAM), programmable ROM (PROM), erasable programmable ROM (EPROM), electronically erasable programmable ROM (EEPROM), dynamic RAM (DRAM), magnetic disk (e.g., floppy disk and hard drive), optical disk (e.g. CD-ROM), and any other device that can store digital information. The instructions may be stored on a medium in either a compressed and/or encrypted format. Accordingly, in the broad context of the present invention, and with attention to FIG. 5, the system for dispensing a medium on a large scale three dimensional surface may contain a processor (510) and machine readable media (520) and user interface (530).

Although illustrative embodiments and methods have been shown and described, a wide range of modifications, changes, and substitutions is contemplated in the foregoing disclosure and in some instances some features of the embodiments or steps of the method may be employed without a corresponding use of other features or steps. Accordingly, it is appropriate that the claims be construed broadly and in a manner consistent with the scope of the embodiments disclosed herein.

What is claimed is:

1. A system comprising:
    a mobile platform configured for motion comprising at least three degrees of freedom;
    said mobile platform comprising a base and an end-effector coupled through a manipulator, said base and end-effector configured to dispense a medium onto a surface having a width or a length of at least two meters;

a laser scanning metrology system configured to measure a position and orientation corresponding to an actual position and orientation of said end-effector relative to said surface;

a base wheel odometry sensor configured to measure distance travelled by a wheel of said base;

an end-effector angle sensor configured to measure an orientation angle of said end-effector;

a manipulator joint angle sensor configured to measure an orientation angle of a joint of said manipulator;

an inertial measurement sensor configured to provide base, manipulator and end-effector inertial measurements;

an autonomous controller comprising a recursive state estimator configured to generate an estimate of a position and an orientation of said end-effector based at least in part on said position and orientation of said end-effector measured by the laser scanning metrology system and on a physical characteristic model of said system, and further based on measurements provided by: said base wheel odometry sensor, said end-effector angle sensor, said manipulator joint angle sensor and said inertial measurement sensor; said autonomous controller further configured to command said base and said end-effector to adjust said actual position and orientation of said end-effector based upon said estimated position and orientation and to command said end-effector to dispense said medium onto said surface; and a path planner configured to generate a trajectory for said end-effector with respect to said surface, wherein said trajectory avoids end-effector positions associated with a loss of one of said degrees of freedom.

2. The system of claim 1 wherein said surface has a width or a length of less than or equal to three hundred meters.

3. The system of claim 1 wherein said surface has a depth of at least one millimeter at at least one location.

4. The system of claim 1 further comprising a sensor configured to sense a position or orientation corresponding to said actual position or orientation of said end-effector relative to said surface.

5. The system of claim 4 wherein said autonomous controller is configured to generate an estimate of a position and an orientation of said end-effector based at least in part on said measured position and orientation and said sensed position or orientation.

6. The system of claim 1 further comprising a manipulator coupled between said base and said end-effector wherein said manipulator is configured to adjust a position or an orientation of said end-effector relative to said base.

7. The system of claim 1 including a user interface coupled to said autonomous controller wherein said controller is further configured to receive data corresponding to a dimension and orientation of said surface and data corresponding to an image to be generated on said surface.

8. The system of claim 1 wherein said surface is defined by a plurality of points and further comprising generating a surface data file based upon said plurality of points.

9. The system of claim 1 wherein said surface is defined by a finite number of parameters and further comprising generating a surface data file based upon said parameters.

10. A method for dispensing a medium onto a surface having a width or a length of at least two meters comprising:
providing a mobile platform configured for motion comprising at least three degrees of freedom;
said mobile platform comprising a base and an end-effector coupled through a manipulator, said base and end-effector configured to dispense a medium onto said surface;
measuring a position and orientation corresponding to a position and orientation of said end-effector relative to said surface, said measuring performed by a laser scanning metrology system coupled to said mobile platform;
measuring distance travelled by a wheel of said base;
measuring an orientation angle of a joint of said manipulator;
performing inertial measurements associated with said base, manipulator and end-effector;
estimating a position and an orientation of said end-effector based at least in part on said measured position and orientation of said end-effector and on a physical characteristic model of said base and end-effector, and further based on said measured distance travelled by said wheel, said measured orientation angle of said joint and said inertial measurements; wherein said estimating is performed using recursive state estimation;
autonomously adjusting said position and said orientation of said end-effector based upon said estimated position and orientation;
commanding said end-effector to dispense said medium onto said surface; and
generating a trajectory for said end-effector with respect to said surface, wherein said trajectory avoids end-effector positions associated with a loss of one of said degrees of freedom.

11. The method of claim 10 further comprising sensing a position or orientation corresponding to said actual position or orientation of said end-effector.

12. The method of claim 11 further comprising generating an estimate of said position and said orientation of said end-effector based at least in part on said measured position and orientation and said sensed position or orientation.

13. The method of claim 10 further comprising adjusting a position or an orientation of said end-effector relative to said base.

14. The method of claim 10 further comprising receiving data corresponding to a dimension and orientation of said surface and data corresponding to an image to be generated on said surface.

15. An article comprising a non-transitory storage medium having stored thereon instructions that when executed by a machine result in the following operations:
commanding motion of a mobile platform, said mobile platform configured for motion comprising at least three degrees of freedom;
measuring a position and orientation corresponding to a position and orientation of an end-effector, coupled to a base of said mobile platform through a manipulator, relative to a surface having a width or a length of at least two meters, said measuring performed by a laser scanning metrology system coupled to said mobile platform;
measuring distance travelled by a wheel of said base;
measuring an orientation angle of a joint of said manipulator;
performing inertial measurements associated with said base, manipulator and end-effector;
estimating a position and an orientation of said end-effector based at least in part on said measured position and orientation of said end-effector and on a physical characteristic model of said end-effector, and further based on said measured distance travelled by said wheel, said measured orientation angle of said joint and said inertial measurements, wherein said estimating is performed using recursive state estimation;

autonomously adjusting said position and said orientation of said end-effector based upon said estimated position and orientation;

commanding said end-effector to dispense said medium onto said surface; and generating a trajectory for said end-effector with respect to said surface, wherein said trajectory avoids end-effector positions associated with a loss of one of said degrees of freedom.

16. The article of claim 15 wherein said storage medium having stored instructions thereon that when executed by a machine result in the following additional operations:

sensing a position or orientation corresponding to said actual position or orientation of said end-effector.

17. The article of claim 16 wherein said storage medium having stored instructions thereon that when executed by a machine result in the following additional operations:

generating an estimate of said position and said orientation of said end-effector based at least in part on said measured position and orientation and said sensed position or orientation.

\* \* \* \* \*